(12) United States Patent
Brock et al.

(10) Patent No.: US 9,134,966 B2
(45) Date of Patent: Sep. 15, 2015

(54) MANAGEMENT OF MIXED PROGRAMMING LANGUAGES FOR A SIMULATION ENVIRONMENT

(71) Applicant: International Business Machines Corporation, Armonk, NY (US)

(72) Inventors: Bishop C. Brock, Coupland, TX (US); John Farrugia, Austin, TX (US); Andreas Koenig, Boeblingen (DE); Jeshua D. Smith, Austin, TX (US); Todd A. Venton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/104,103

(22) Filed: Dec. 12, 2013

(65) Prior Publication Data

US 2015/0169294 A1 Jun. 18, 2015

(51) Int. Cl.
G06F 9/44 (2006.01)
(52) U.S. Cl.
CPC .................................. G06F 8/31 (2013.01)
(58) Field of Classification Search
CPC ............................................. G06F 8/30–8/38
USPC .................................................. 717/124–167
See application file for complete search history.

(56) References Cited

U.S. PATENT DOCUMENTS

| | | | |
|---|---|---|---|
| 4,862,347 A * | 8/1989 | Rudy | 703/14 |
| 5,148,379 A * | 9/1992 | Konno et al. | 703/2 |
| 6,795,963 B1 | 9/2004 | Andersen et al. | |
| 8,136,093 B2 | 3/2012 | White | |
| 2007/0234286 A1 * | 10/2007 | Huang et al. | 717/114 |
| 2009/0254888 A1 | 10/2009 | Nicholls et al. | |
| 2012/0131564 A1 * | 5/2012 | Das | 717/168 |
| 2014/0149969 A1 * | 5/2014 | Brower et al. | 717/140 |

FOREIGN PATENT DOCUMENTS

| | | |
|---|---|---|
| EP | 1025492 A1 | 8/2000 |
| EP | 1025492 B1 | 4/2003 |

OTHER PUBLICATIONS

Harrold, S.J.; Diamant, P.E., "A high-level test program language for analog and mixed-signal test program development," European Test Conference, 1993. Proceedings of ETC 93., Third , pp. 519-520, Apr. 19-22, 1993.*

(Continued)

*Primary Examiner* — Satish Rampuria
(74) *Attorney, Agent, or Firm* — Jonathan V. Sry; Steven L. Bennett

(57) ABSTRACT

A system and a method for simulation using multiple programming languages is provided. The method can include receiving an annotated source having a first plurality of instructions written in a first programming language and receiving an annotation having a second plurality of instructions written in a second programming language and associated with an annotated instruction from the first plurality of instructions. The method can include extracting the second plurality of instructions to create a routine from the annotation. The method can include building a shared library that contains the routine. The method can include building an application object file by assigning an address to each instruction of the first plurality instructions. The method can include creating an annotation table that contains an address for the annotated instruction and an associated symbol.

17 Claims, 11 Drawing Sheets

(56) References Cited

OTHER PUBLICATIONS

Popescu, G.; Goldgeisser, L., "Model compatibility aspects in multilingual simulation environments," Circuits and Systems, 2006. ISCAS 2006. Proceedings. 2006 IEEE International Symposium on, pp. 999-1002, May 21-24, 2006.*
Hallam, N.; Khodja, R., "Object oriented design of a mixed simulator," Systems, Man, and Cybernetics, 1998. 1998 IEEE International Conference on , vol. 4, pp. 3697-3702 vol. 4, Oct. 11-14, 1998.*
Bohrer et al., "Mambo—A Full System Simulator for the PowerPC Architecture", ACM SIGMETRICS Performance Evaluation Review, Mar. 2004, pp. 8-12, vol. 31, Issue 4, ACM, New York, NY, USA. DOI: 10.1145/1054907.1054910.
"Embedded Systems/Mixed C and Assembly Programming", Wikibooks, last revision Oct. 29, 2012, page last modified Aug. 25, 2013. http://en.wikibooks.org/wiki/Embedded_Systems/Mixed_C_and_Assembly_Programming.
Gao et al., "A Fast and Generic Hybrid Simulation Approach Using C Virtual Machine", CASES '07: Proceedings of the 2007 International Conference on Compilers, Architecture, and Synthesis for Embedded Systems, Sep. 2007, pp. 3-12, ACM, New York, NY, USA. DOI: 10.1145/1289881.1289885.
"GDB: The GDU Project Debugger", gnu.org, Copyright Free Software Foundation, Inc. http://www.gnu.org/software/gdb/.
Ginda et al., "Using Breakpoints in Venkman", MDN Mozilla Developer Network, original publication May 2, 2003, last updated Nov. 1, 2012, © 2005-2013 Mozilla Developer Networks and Individual Contributors. https://developer.mozilla.org/en-US/docs/Using_Breakpoints_in_Venkman.
Gordon, R., "Instruction Set Simulations in C", Embedded: Cracking the Code to Systems Development, Embedded.com, Apr. 15, 2002. http://www.embedded.com/design/prototyping-and-development/4023923/Instruction-Set-Simulationin-C#.
Grossman et al., "Simulation and Embedded Software Development for Anton, a Parallel Machine with Heterogeneous Multicore ASICs", CODES + ISSS '08: Proceedings of the 6th IEEE/ACM/IFIP International Conference on Hardware/Software Codesign and System Synthesis, Oct. 2008, pp. 125-130, ACM, New York, NY, USA, © 2008. DOI: 10.1145/1450135.1450165.
IBM, "RISCWatch Debugger", https://www-01.ibm.com/chips/techlib/techlib.nsf/products/RISCWatch_Debugger.
Keegan, "Embedding GDB Breakpoints in C Source Code", blogpost, main is usually a function, posted Jan. 19, 2012, http://mainisusuallyafunction.blogspot.com/2012/01/embedding-gdb-breakpoints-in-c-source.html.
Magnusson et al., "Simics: A Full System Simulation Platform", Computer, Feb. 2002, pp. 50-58, vol. 35, Issue 2, © 2002 IEEE. DOI: 10.1109/2.982916.
Maus et al., "Vx86: x86 Assembler Simulated in C Powered by Automated Theorem Proving", AMAST 2008: Proceedings of the 12th International Conference on Algebraic Methodology and Software Technology, pp. 1-15, Springer-Verlad Berlin, Heidelberg © 2008.
Wind River, "Go Ahead—Break All the Rules: and Accelerate Every Phase of Development", Wind River Simics Full System Simulation, © 2013 Wind River. http://www.windriver.com/products/simics/.

\* cited by examiner

```
1   #include "hook.h"
2   ##'#include "compute.h"
3   ##'static int G_expected;
4   // Compute D0, D1 into D0
5   .global compute
6   compute:
7   ##@ int d0 = cpu.d0.read(), d1 = cpu.d1.read();
8   .hook compute.S_0  ##@ G_expected = computeSpec(d0, d1);
9       srdi  D0, D0, 2 # Start by dividing D0 by 4
10      ... Other code and hooks ...
11  ##@ int d0 = cpu.d0.read();
12  ##@ if (d0 != G_expected) {
13  ##@     sim.error("Expected %d, computed %d\n",
14  ##@                G_expected, d0);
15  .hook compute.S_4 ##@ }
16      ret
```

FIG. 2

```
1   #include "hooksupport.H"
2
3   # 2 "compute.S"
4   #include "compute.h"
5   static int G_expected;
6
7   static void
8   hook_0(CpuState& cpu, SimState& sim)
9   {
10  # 7 "compute.S"
11    int d0 = cpu.d0.read(), d1 = cpu.d1.read();
12    G_expected = computeValue(d0, d1);
13  }
14  # 14 "compute.hook.cc"
15
16  ... Other hooks ...
17
18  static const char* const file = "compute.S";
19
20  static HookRoutine hooks[] = {
21      hook_0, hook_1, hook_2, hook_3, hook_4
22  };
23
24  static HookTable table = {5, hooks};
25
26  static void init() {
27      HookManager::registerHookTable(file, &table);
28  }
29
30  static HookInitializer initializer(init);
```

FIG. 4

```
1   #include "hooksupport.hh"
2
3   static const char* files[2] = {
4   "hello.S"
5   "compute.S",
6   };
7
8   static Hook hooks[6] = {
9   {00038608, files[0], 0},
10  {0004011c, files[1], 0},
11  {0004020c, files[1], 1},
12  {00040230, files[1], 2},
13  {00040230, files[1], 3},
14  {00040348, files[1], 4}
15  };
16
17  static void init()
18  {
19    for (int i = 0; i < 6; i++) {
20      HookManager::registerHook(&(hooks[i]));
21    }
22  }
23
24  static HookInitializer initializer(init);
```

Lines 9-14: ANNOTATIONS AND ADDRESSES

MANAGEMENT OF MIXED PROGRAMMING LANGUAGES FOR A SIMULATION ENVIRONMENT

BACKGROUND

This disclosure generally relates to programming of computing systems, and in particular, to managing programming languages in a simulation environment. Although computer programming in the modern era is dominated by programming in high-level languages such as C++ and Java®, many instances still arise where programming is done in assembly language. Critical computational kernels may benefit from hand-tuning as assembler routines, especially if they use architecture-specific instructions that are not supported by compilers. The core code of any operating system or real-time kernel may include at least some assembly language for context management and interrupt handling. Space-constrained embedded applications may be programmed in assembly language to give the programmer full control over the size and performance of the final binary. Some embedded environments may not support high-level language compilers at all, leaving assembly language as the remaining programming option. Therefore, systems and methods for assembly language programming have wide practical importance.

SUMMARY

Consistent with embodiments of the disclosure, a method, and system for simulation using multiple programming languages resource is provided.

In certain embodiments of the disclosure, a method can be directed toward simulation using multiple programming languages. The method can include receiving an annotated source having a first plurality of instructions written in a first programming language and receiving an annotation having a second plurality of instructions written in a second programming language and associated with an annotated instruction from the first plurality of instructions. The method can include extracting the second plurality of instructions to create a routine from the annotation. The method can include building a shared library that contains the routine. The method can include building an application object file by assigning an address to each instruction of the first plurality instructions. The method can include creating an annotation table that contains an address for the annotated instruction and an associated symbol. The method can include creating a symbol table that links the associated symbol to the routine in the shared library.

In embodiments of the disclosure, a method can be directed toward simulating an execution of an application object file having a high-level programming language element and an assembly programming language element. The method can include uploading the application object file that contains instruction addresses for first instructions written in assembly programming language and a shared library that contains a routine that contains second instructions written in a high-level programming language. The method can include receiving, as part of executing the first instructions, an instruction address for one of the first instructions. The method can include accessing an annotation table that contains an instruction address for the received instruction address and an associated symbol. The method can include comparing the received instruction address to at least one instruction address in the annotation table. The method can include accessing, in response to the comparison, a symbol table that links the associated symbol to the routine in the shared library. The method can also include executing the routine from the shared library.

Various embodiments of the disclosure are directed toward a system for managing a high-level programming language on a simulator. The system can include a pre-processor module operating on one or more computer processors. The pre-processor module can be configured to receive an annotated assembler source file that contains instruction addresses for first instructions written in assembly programming language and a shared library that contains a routine that contains second instructions written in a high-level programming language. The pre-processor module can be configured to extract a routine containing the second instructions from the annotated assembler source file into an extracted routine file using an extraction script. The system can also include a build engine operating on one or more computer processors. The build engine can be configured to create an application object file from the annotated assembler source file. The build engine can be configured to create an annotation shared library from the extracted routine file and from a symbol table of the application object file. The system can also include an annotation manager operating on one or more computer processors. The annotation manager can be configured to load the annotation shared library and the application object file. The annotation manager can be configured to receive an instruction address from a simulator that indicates a first instruction on the application object file. The annotation manager can be configured to access an annotation table that associates an annotation table address with the extracted routine file in the annotation shared library. The annotation manager can be configured to compare the instruction address with the annotation table address. The annotation manager can be configured to access, in response to the comparison, a routine in the extracted routine file from the annotation shared library. The annotation manager can be configured to execute the routine from the annotation shared library.

BRIEF DESCRIPTION OF THE DRAWINGS

Embodiments are illustrated by way of example, and not by way of limitation, in the figures of the accompanying drawings in which like reference numerals refer to similar elements or steps.

FIG. 2 illustrates an example of code in a labeled assembler source file, according to various embodiments.

FIG. 4 illustrates an example of routine contents in the extracted routine file, according to an embodiment.

FIG. 6 illustrates an implementation of an annotation index source file, according to various embodiments.

Like reference numbers and designations in the various drawings indicate like elements.

DETAILED DESCRIPTION

Figure 1:
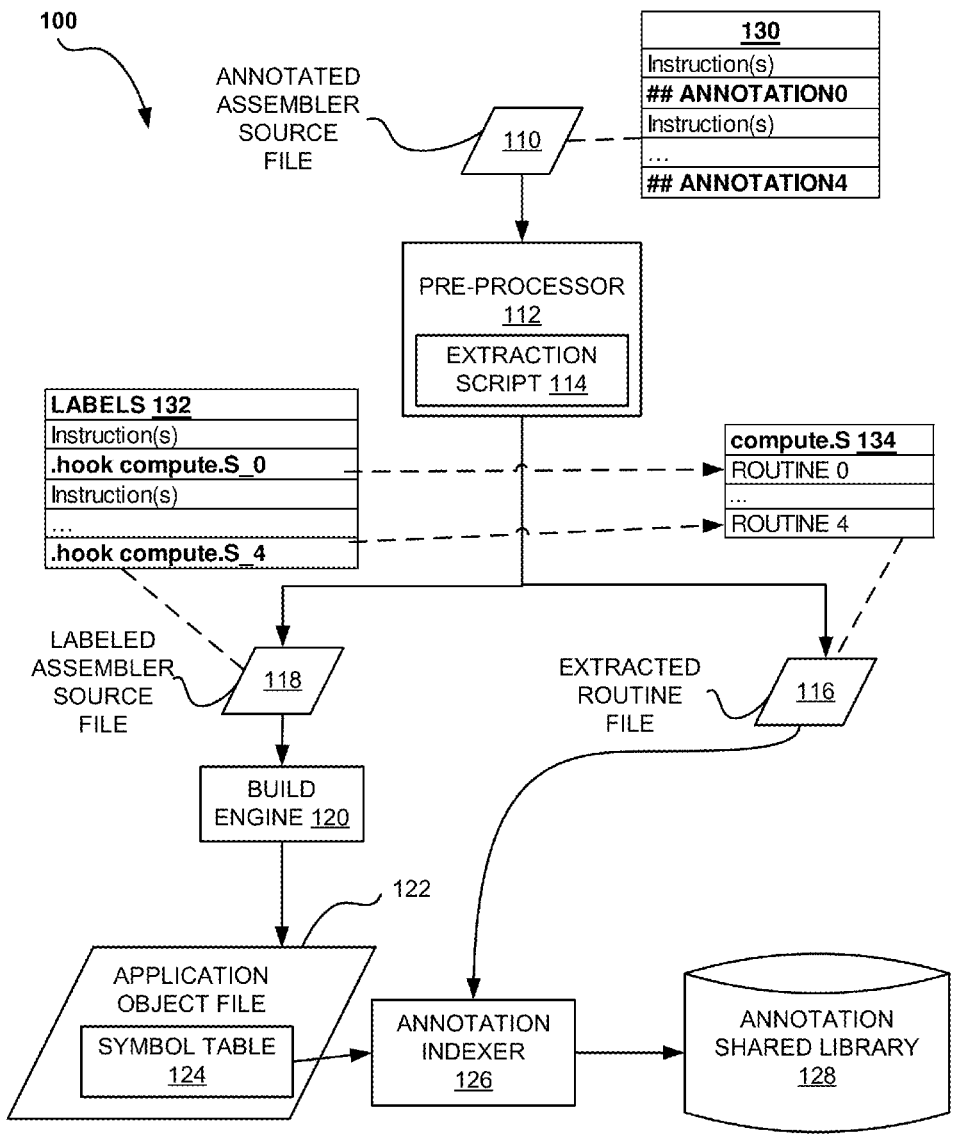
FIG. 1 illustrates a system that builds an annotation shared library from an annotated assembler source file, according to various embodiments.

Aspects of the present disclosure are directed toward a method and system of implementing, in a simulation, the association of a routine written in a high-level language with assembler instructions written in an assembly language.

Embodiments of system can aid in the successive transformation of high-level language algorithms into equivalent assembly language programs (for cases where no compiler for the target machine exists), add assertions and other verification constructs to assembly language that do not alter the final target binary, and add various forms of debugging procedures to assembly language programs that again do not alter the final binary, Embodiments of the present disclosure can be implemented using a method to prepare files for use in the simulator and a method to simulate the instructions and routines from the files. Particular embodiments are directed toward preparing files in a manner that allows for assembly language to be annotated with higher level code and without the use of instructions that alter the target binary generated from the assembly language. During simulation, the annotations can be used to trigger the execution of functions written in the higher level code. The preparation can include extracting the routines written in a high-level language from an annotated assembler source file. The preparation can include associating the routine with an address of the instruction from the annotated assembler source file. The simulation can include executing the routine when the address is used. Although not necessarily limited thereto, embodiments of the present disclosure can be appreciated in the context of using high-level language routines in an assembly language simulation.

Aspects of the present disclosure can facilitate difficulties in verification and debugging of assembly programming. Programmers can annotate their high level language code with assertions and print statements to check important invariants and provide detailed traces of the execution of a program to help locate bugs. These approaches may not be practical, or even possible, with assembler programs in embedded environments. Adding an inline assertion or a call to a logging routine in an assembler program can consume space, may only be possible if an output device or file system is available to capture the logs, and may radically alter the program depending on whether verification support is present or not—alterations normally assumed to be correct when high-level language compilers are used to implement similar support. Debugging with an external debugging tool may be difficult for proprietary embedded controller architectures, e.g., without a significant development effort to create hardware and/or software interfaces to the debugger.

According to embodiments of the present disclosure, assembler programs can be annotated with snippets of code written in a high-level language that can be referred to as annotations or hooks. The term hook can be used to refer to an annotation throughout the disclosure. The annotations can be executed in the context of the Instruction-Set Simulator (ISS) used to simulate the assembly language program during development and debugging, and modern programming infrastructures may allow the annotations to be written in virtually any language. For illustrative purposes, C++ can be used through the disclosure for the annotations and examples that follow. The various embodiments allow for the annotations to be written in a variety of other languages.

According to embodiments, annotations can be coded as special forms of comments that can be ignored during the assembly of the program. Thus, the comments do not affect the binary, and the same source code generating the same binary can be used both for production purposes and for system-level simulation analysis. The annotations can be recognized and processed by an extraction and build processes discussed herein. Generally, two types of annotations can be used to support C++ annotations. Declarative annotations can be extracted verbatim into the C++ annotation source code, and functional annotations can be extracted as subroutine calls that are virtually invoked at that point in the execution of the assembler binary. The concept of annotation is illustrated in the disclosure herein and annotations can be extended to transformation and other applications of arbitrary complexity.

References to an address can apply to an instruction address, but can also apply to a data address. A memory simulation address can refer to either an instruction address, or a data address. In various embodiments, reference to an instruction address, or programming instruction address, can be used interchangeably with the data address. The term instruction can refer to a part of a program or a sequence of code that is processed by a simulator.

FIG. 1 illustrates a system 100 that builds an annotation shared library 128 from an annotated assembler source file 110, according to various embodiments. In certain embodiments the annotated assembler source file 110 can have annotations written in a high level language. These annotations can be extracted, syntax can be added to convert the annotations to routines, and the annotation shared library 128 can be built from the extracted routine. The annotated assembler source file 110 can be a source file that contains instructions written in an assembly language. The annotated assembler source file 110 can also include annotations, e.g., comments that ordinarily would not be processed by a simulator. The annotation shared library 128 can be a library of routines written in a high-level language associated with the addresses of instructions from the annotated assembler source file 110. The annotation shared library 128 can be used by the simulator to retrieve and execute the routine when the address associated with the routine is processed by the simulator.

An example of the annotated assembler source file 110 can be found in the table 130. Table 130 illustrates a potential structure of the annotated assembler source file 110. For example, the instructions can be in the assembly language and the annotations, e.g., annotation0 and annotation4, can be written in the high-level language. The annotations can be indicated by special forms of comments to indicate that an assembler should not process the annotation. The annotations can contain high-level language statements or subroutine bodies for the simulator to execute.

The annotated assembler source file 110 can be processed by the pre-processor 112, which can also be referred to as the pre-processor module 112. The pre-processor 112 can receive the annotated assembler source file 110 as an input and separate the annotations from the annotated assembler source file 110. The pre-processor 112 can use an extraction script 114 in order to extract the routines from the annotated assembler source file 110. In various embodiments, the pre-processor can be a program that performs the extraction of an extracted routine file 116 from the annotated assembler source file 110.

The pre-processor 112 can extract the annotations from the annotated assembler source file 110 into a new file, i.e. a labeled assembler source file 118. The virtual link between a functional annotation and its address in the final binary is established by inserting a label into the annotated assembler source file 110 to denote the location of the functional annotation. Naming conventions can allow the label to be associated with the functional annotation at run time in an Instruction Set Simulator (ISS).

Since assembly language is a line-oriented language, and since the annotations are easily recognized special forms of comment lines, the annotations can be easily located and extracted. The pre-processor 112 can also provide syntax to the extracted routines in the extracted routine file 116. For example, the pre-processor 112 can add syntax that transforms high-level language statements and subroutine bodies into complete and valid subroutine forms for a high-level language, including argument prototypes that allow the annotation routines to fully access and control the state of the simulated system. The pre-processor 112 can also expand macros in the assembler source file 110 and in the annotations. In addition, the pre-processor 112 can add labels to the annotated assembler source file 110 to indicate where the routines are located and produce a labeled assembler source file 118. The label can be a reference to the routine found in the annotations. According to various embodiments, the labels can be referred to as meta-information.

An example of the labeled assembler source file 118 is found on table 132. Table 132 illustrates the labels in the labeled assembler source file 118. The labels in the labeled assembler source file 118 can refer to routines in the extracted routine file 116. Table 132 illustrates an embodiment where the labels are not inserted explicitly in the labeled assembler source file 118, but are instead generated by assembler macros. An example of the extracted routine file 116 is found on table 134. The routines in the extracted routine file 116 can refer to the annotations found in the annotated assembler source file 110. In various embodiments, the extracted routine file 116 can correspond based on the annotations in a single annotated assembler source file 110.

The extracted routine file 116 can also be formed for a particular high-level language in a single annotated assembler source file 110. For example, there may be an extracted routine file 116 for all the routines in the annotated assembler source file 110 written in the Python language and an extracted routine file 116 for all the routines in the annotated assembler source file 110 written in C++. The extracted routine file 116 can include the routines with the appropriate syntax to allow an interpreter to read the high-level language. The labels implied by the assembler macros in table 132, e.g., .hook compute.S_0, can refer to routines in 134, e.g., Routine 0. The extracted routine file 116 can also correspond to a set of routines. For example, the extracted routine file 116 can be a file for the compute.S series of routines. Each routine can be indexed to compute.S. The labels in table 132 can reference routines in the extracted routine file 116.

A build engine 120 can take the labeled assembler source file 118 and convert the labeled assembler source file 118 into an application object file 122. The build engine 120 can be described further herein. The application object file 122 can be formatted into machine readable code. The application object file 122 can include a symbol table 124. The symbol table 124 can associate an address in the application object file 122 to the label from the labeled assembler source file 118. The annotation indexer 126 can use the symbol table 124 in the application object file 122 and one or more extracted routine files 116 to produce an annotation shared library 128.

The annotation shared library 128 can be a collection of one or more extracted routine files 116 for a series of annotated assembler source files. The annotation shared library 128 can be shared between a plurality of annotated assembler source file in the simulation. For example, the annotation shared library 128 can contain the routines for compute.S but could also contain the routines for multiple labels. The annotation shared library 128 can be a dynamic-link library (DLL) that refers to one or more extracted routine files. An ISS can locate the compute.S routine file based on an address and execute the routine in high-level code from the compute.S routine file as described herein.

FIG. 2 illustrates an example 200 of code in a labeled assembler source file, according to various embodiments. The labeled assembler source file can include the assembler source file and the annotations written in high level code. The labeled assembler source file can also include labels that point to routines in the extracted routine file. The example 200 can be a representation of the labeled assembler source file 118 in FIG. 1. The example 200 assumes an assembler that uses # as the comment character, and that the annotated assembler source file is preprocessed by the C pre-processor which also makes // a comment.

The special comment form ## on line 2 signifies a declarative annotation, and the remainder of the line, i.e. #include "compute.h" can be copied (verbatim) to the extracted routine file 116 in FIG. 1. The special comment form ##@ on line 7 signifies a functional annotation. By convention, contiguous ##@ lines can be combined into a single routine. In various embodiments, a "one-liner" annotation form ##1 @, can be added so that continuous lines are not used. The one-liner can be used where annotations are generated by C pre-processor or assembler macro expansions.

The formal parameters of routines will vary depending on the particular simulation environment and other requirements. The final form of the extracted routine can allow the routine to access the register and control state of the CPU being simulated as well as the state of the entire simulation if necessary. For example, the routines can have the C++ prototype: void (*functionalHook)(CpuState& cpu, SimState& sim), where "cpu" is a reference to the particular CPU being simulated, and "sim" is a reference to the entire simulated system state. The environment can assume that any errors are signaled directly to the simulator, or the routines may be required to provide return values indicating success or failure.

The example 200 can assume a computation mapping two data register inputs D0 and D1 into the result again stored in D0, and also assumes that register values in the simulated state are accessible via data members of the CpuState object. At entry, the routine at lines 7 and 8 can compute the expected value of an assembler computation using the "golden model" computeSpec( ) into the annotation-global variable "G_expected". At exit, the routine beginning at line 11 compares the contents of D0 with the expected value and signals an error in the event of a mismatch. Several methods could be used to make state-saving annotations to support multiprocessor simulations.

A functional annotation can be always active and associated with the current assembler location counter, effectively binding the routine to the assembler instruction following the annotation. Other types of associations and policies are also possible, e.g., a form that associates the routine with the previous instruction, or forms that identify code in the process of transformation that should not be present or executed in the final application. A functional annotation can access a simulated register state and stop the simulation. Other behaviors can include injecting data into registers to simulate responses of devices that are not yet modeled in the simulation environment, using the system model to read and write system memories, or altering the flow of control to bypass assembler statements which should not be executed under conditions determined by the annotation.

The data that routines access or modify can be held in a small set of target machine registers accessible by name through the ISS CPU model. A custom ISS can also provide Application Programming Interfaces (APIs) that allow annotations to access memory in the simulated memory space, and similar symbol table APIs also exist in the Simics environment.

Even though the example 200 illustrates a labeled assembler source file, the difference between the annotated assembler source file and labeled assembler source file can be the insertion of the labels, i.e., .hook macro calls, at the final lines of functional annotations, i.e., lines 8 and 15. The .hook macros are not inserted on separate lines so that the line numbering of the original source file is the same with or without the use of the macros. Modifying the source code line numbering can confuse assembler listings and diagnostics which are keyed to the annotated assembler source file in the assembler, e.g., a GNU assembler. The example 200 assumes the .hook macro is defined by the header file hook.h which can be included into any assembler source file that uses annotations.

Figure 3:
FIG. 3 illustrates an implementation of a .hook macro that a label in a labeled assembler source file calls, according to various embodiments.

FIG. 3 illustrates an implementation 300 of the .hook macro, according to various embodiments. The .hook macro can be an intermediary between the label and the routine. The .hook macro can be part of the extracted routine file and can generate labels. The extraction script 114 in FIG. 1 can create instances of the .hook macro. Each instance of the .hook macro can generate a label. Labels can be meta-information that does not affect the final binary form of the assembler program. However, labels can be relocated by a link editor so that the labels are bound to the address of the instruction that follows. The annotated assembler source file and a sequence number within the annotated assembler source file can be used to uniquely identify an annotation. The complexity of the .hook macro can arise from the need to support functional annotations in assembler macros. A functional annotation can be tagged once in the source code (inside the macro definition) and may be expanded multiple times. The .hook macro can avoid symbol name collisions by augmenting the symbol name with a unique binary string form of the absolute sequence number of all annotation instances appearing in the annotated assembler source file. This binary string can be generated by the recursive .hook_helper macro on line 8.

FIG. 4 illustrates an example 400 of routine contents in the extracted routine file, according to an embodiment. The extracted routine file can contain the annotations found in the annotated assembler source. Since a compiler may not be able to parse the annotations directly, syntax can be added to the annotations to make the routines parsable by the compiler. The example 400 can be from the extracted routine file 116 in FIG. 1. Declarative annotations (lines 4 and 5) can be inserted and functional annotations (line 7) can be converted to static routines. Static routines can be used to avoid name collisions with other routines not appearing in the extracted routine file. The extracted routines can be tagged with special C preprocessor marks (e.g., line 3) that indicate the point of origin in the annotated assembler source file in order to aid programmers by ensuring that any error messages refer to the annotated assembler source file instead of the extracted routine file in the event of a compile error.

The system-level simulation environment can be enhanced with a C++ singleton class named Hookmanager or Annotation manager implementing a generic symbol table and lookup mechanism for functional annotations. The code following the routines (lines 18-30) comprises static, load-time initialization of Hookmanager data structures that allow the functional annotations to be identified and executed at run time. The address of each routine can be sequentially stored in a particular table, then the table can be installed in the Hookmanager and indexed by the annotated assembler source file. The HookInitializer can be a simple class with no behavior other than a constructor that executes an arbitrary function, e.g., init( ).

Figure 5:
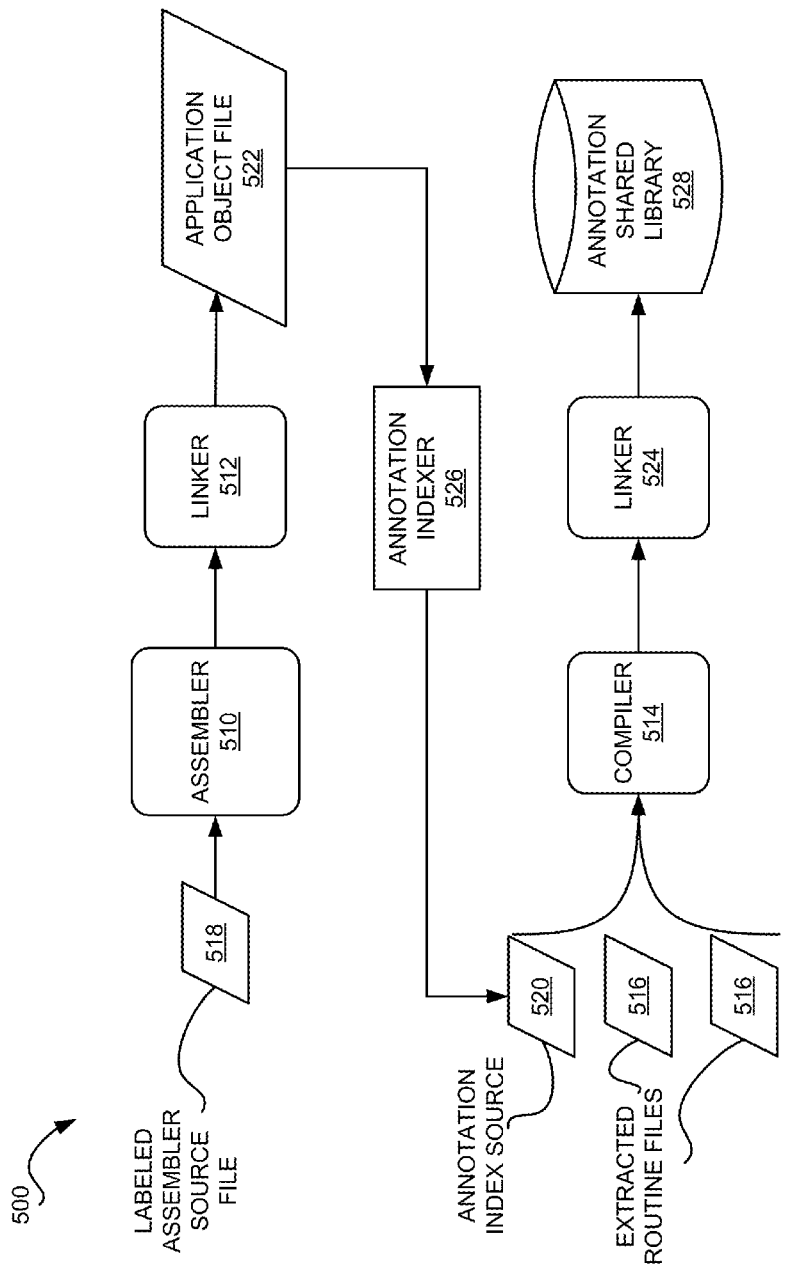
FIG. 5 illustrates a build engine that produces an application object file and an annotation shared library, according to various embodiments.

FIG. 5 illustrates a flow diagram 500 for a build engine that produces an application object file 522 and an annotation shared library 528, according to various embodiments. The build engine can correspond to the build engine 120 and the annotation indexer 126 from FIG. 1. Generally, the build engine can use the labeled assembler source file 518 generated by the extraction process to form the application object file 522.

The build engine can build the application object file 522 using an assembler 510, and a linker 512. In various embodiments, the assembler 510 can assemble the instructions from the labeled assembler source file 518. The assembler 510 can create object code by translating assembly instruction mnemonics into opcodes, and by resolving symbolic names for memory locations and other entities. The assembler 510 can include macro facilities for performing textual substitution, e.g., to generate common short sequences of instructions as inline. The assembler 510 converts the assembly language into machine-readable code, according to various embodiments. The assembler 510 can also lay the groundwork for the relocation process performed by linker the linker 512.

The linker 512, or link-editor, can accept the results from assembler 510 having assembled one or more labeled assembler source files 518 as input and produce an application object file 522, which may be an executable program. The linker 512 can perform relocation fixups and symbol resolution. The linker 512 can also merge symbolic information and search for referenced labels in shared libraries and archive libraries. Linkers can be producers and consumers of object files, and consumers of archive files. The selection of command-line options determines what type of object the linker produces. A final link can produce an executable object file or shared library. A partial link can produce a re-locatable object that can be included in a future link. The linker 512 can be responsible for linking the segments of machine-readable code to each other and using the address of the instructions. The annotations found in the labeled assembler source 518 would not be present in the application object file 522.

The application object file 522 can be processed by an annotation indexer 526, which can be a script that indexes the annotations in the application object file 522. The output produced by the annotation Indexer 526 can also be a C++ file that is compiled and linked with all of the extracted routine files 516 to create an annotation shared library 528, e.g., a Dynamic-Link Library (DLL), that can be loaded into the system-level simulator.

The annotation indexer 526 can examine the symbol table of the application object file 522, which can be created by the linker 512 from labels in the labeled assembler source 518. The annotation indexer 526 can collect, from the symbol table, the names and final link addresses of all of the labels associated with functional annotations. For example, in a Linux® implementation, the symbol table can be accessed using the nm utility. The labels can be easily recognized by naming convention. For example, if compute.S is assembled and linked with hello.S, then the application object file 522 might contain the symbols and addresses shown herein, e.g., FIG. 7. When multiple hooks are associated with the same address, the binary string portion of the label name can be used as a key to ensure that the routines are always executed in the order they appear in the labeled assembler source file 518. The annotation indexer 526 can then generate an annotation index source file 520.

The compiler 514 can receive and compile the annotation index source 520 and one or more extracted routine files 516 into machine readable code. The extracted routine file 516 can include compute.S produced in FIG. 1. The linker 524 can link the machine readable segments into the annotation shared library 528.

FIG. 6 illustrates an implementation 600 of an annotation index source file, according to various embodiments. The annotation index source file can be used to locate an address of a symbol in the application object file and create an annotation index that matches the address in the application object file to an extracted routine file containing the routine. The implementation 600 can be a representation of the annotation index source 520 from FIG. 5. The annotation index source 520 can implement a load-time initialization of Hookmanager data structures that allow the routines to be located at run time. Briefly, each address that refers to an annotation is associated with the file that implements the routine. The annotation table in the annotation shared library can map sequence/address numbers to the annotation files. The annotation table can be created from the annotation index source 520. Thus, the routine associated with an instruction address can be located and executed at run time.

Figure 7:
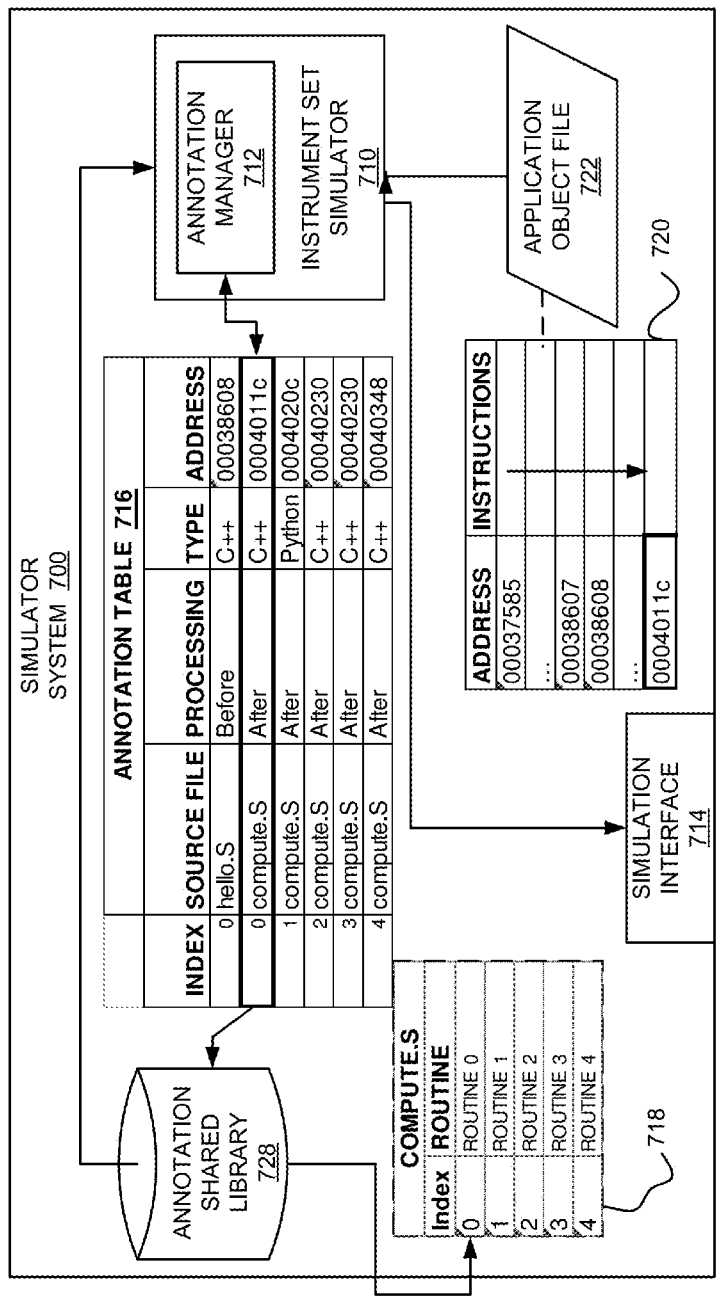
FIG. 7 illustrates a simulator system that accesses a routine written in a high-level language, according to various embodiments.

FIG. 7 illustrates a simulator system 700 that accesses a routine written in a high-level language, according to various embodiments. The simulator system 700 can include an ISS 710. The ISS 710 can be a simulation model, usually coded in a high-level programming language, which can mimic the behavior of computer hardware, such as a mainframe or microprocessor system, by reading instructions and maintaining internal variables which represent the processor's registers and other system state.

The ISS 710 can create a simulated state using the instructions from the application object file 722. The ISS 710 can output simulation results to a simulation interface 714. The ISS 710 can have an annotation manager 712 that accesses the routines written in the high-level language. The term annotation manager 712 can be used interchangeably with the term Hookmanager.

The simulator system 700 can load the application object file 722 into a simulated memory contained in a simulated state, and then dynamically load the annotation shared library 728 into the context of the ISS 710. The annotation files created by extraction and indexing scripts implement dynamic load-time initialization of the annotation manager 712 with the information required to locate and execute the routines. The ISS 710 can be modified to simulate behavior with the high-level routines. An ISS 710 can execute a continuous fetch-decode execute loop, fetching instructions from simulated memory, decoding and executing the instructions against the simulated system state. Now, as each instruction is fetched, the ISS 710 can request the annotation manager 712 to run any hooks that might be associated with the current instruction address. If an address references an annotation file, then the routines associated with the annotation file are located and executed in the order of appearance in the annotated assembler source file. A routine may be called simply for side-effect, may halt simulation, or may change the state of the simulated CPU in such a way as to force the control flow of the executed program to change.

The ISS 710 can receive the application object file 722 in the system 700. The application object file 722 can have a number of machine-readable instructions as shown on table 720. The ISS 710 can read the application object file 722 by address and as shown on table 720, each address has a corresponding instruction.

The annotation manager 712 can look up the addresses in the annotation table 716 to determine if there is a match. If the address in the annotation table 716 matches the address being read from the application object file 722, e.g., table 720, then the annotation table 716 can refer to an annotation file with a particular index. The annotation manager 712 can reference the table associated with the file 718 to locate the corresponding routine. The routine can be processed either before or after the instruction is processed. In various embodiments, the ISS 710 can specify whether to execute the routine before or after an instruction for the simulated address, or for the address being simulated.

As an example, the ISS 710 can read the application object file 722 at address 0004011c. The annotation manager 712 can scan the list of addresses in the annotation table 716 for address 0004011c. Since the address 0004011c has an annotation associated with it, the annotation manager 712 can obtain the routine associated with 0004011c. The annotation manager 712 can note that the routine is written in C++ and to process the routine after the instruction is processed for 0004011c. In various embodiments, the routine can be processed before the instruction is processed for 0004011c. The annotation manager 712 can be referred to an annotation file, i.e., compute.S, and an index that points to the section in the annotation file, i.e., index 0. The annotation manager 712 can find compute.S 718 in the annotation shared library 728 and execute ROUTINE 0 at index 0 after the instruction for 0004011c is executed.

According to various embodiments, the compute.S table 718 can be optional. For example, the annotation table 716 and compute.S table 718 can both be private and would require the compute.S table 718. If the annotation table 716 is private but the routines are public, then the annotation table 716 can refer to the routine directly.

The annotation table 716 can be created when the annotation shared library 728 is loaded by the annotation manager 712. The annotation shared library 728 could be loaded first and the annotation manager 712 can determine which libraries were loaded.

Multiple routines can be associated with a single instruction address. Assuming that multiple routines are associated with an instruction address, then the annotations can be executed in the order they effectively appear in the annotated assembler source file. In various embodiments, the execution of a routine may alter control flow. A routine may simply halt simulation, or may change the state of the simulated CPU in such a way as to force the control flow of the executed program to change.

In various embodiments, annotations in routines can be associated with the actions of reading and writing selected instruction addresses. For example, the simulator system 700 can add a special annotation at the instruction address where data is declared to link the reading and/or writing of data at the instruction address to the routine. The simulator system 700 can use a special annotation form to indicate whether to run the routine on the reading and/or writing of data.

Figure 8:
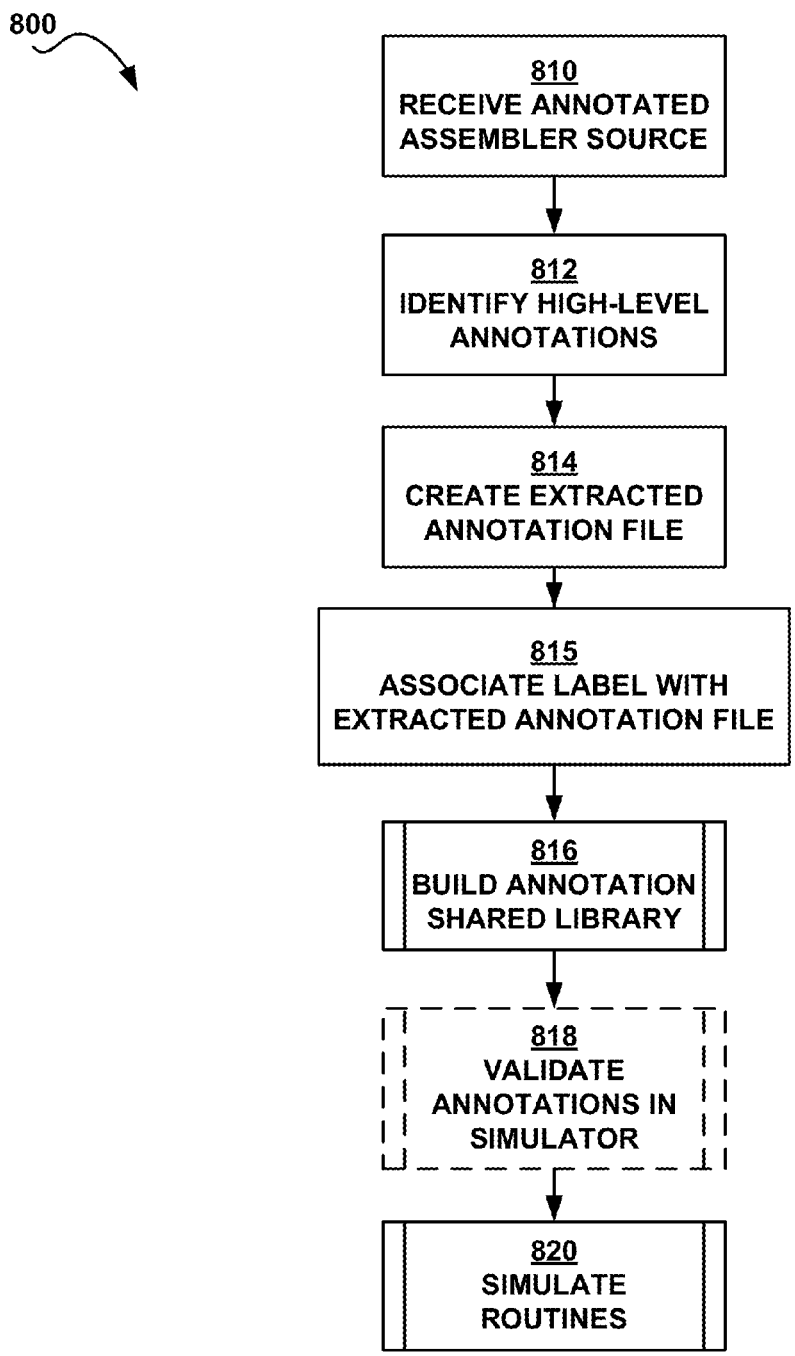
FIG. 8 illustrates a flow chart of a method of using high-level annotations in an instruction set simulation, according to various embodiments.

FIG. 8 illustrates a flow chart of a method 800 of using high-level annotations in an instruction set simulation, according to various embodiments. The method 800 can include the preparation of an annotation shared library and the finding and executing of routines in the annotation shared library by the simulator. The method 800 can begin at operation 810.

In operation 810, the pre-processor can receive an assembler source file with annotations written in a high-level language. The pre-processor and assembler source file can be the same as the pre-processor 112 and the annotated assembler source file 110 found in FIG. 1. Once the annotated assembler source file is received, then the method 800 can continue to operation 812.

In operation 812, the pre-processor can identify the high-level annotations. As discussed herein, the annotations can have a ##@ or other symbol to indicate that the code is an annotation. Once the high-level annotation has been identified, then the method 800 can continue to operation 814.

In operation 814, the pre-processor can extract the annotations from the annotated assembler source file into a separate extracted routine file. The extracted annotations can then be processed further to insert the syntax necessary to enable the annotations to be compiled. The annotations with the syntax and the compiled machine code can be referred to as a routine. In various embodiments, one or more routines can be combined into a separate file, e.g., an annotation file, which can further have an index in the metadata. The index can point to the routine in the annotation file. Once the extracted routine file is created, then the method 800 can continue to operation 815.

In operation 815, the pre-processor can insert labels into the annotated assembler source file where the original annotations start. The labels can refer to the location of the routine in the annotation file. Each label can correspond to a particular address in the annotated assembler source file. The address and labels can be uploaded into a symbol table in the metadata of the labeled assembler source file. Aspects of operation 810, 812, 814, and 815 are described in more detail herein, including the discussion of the system 100 in FIG. 1. After operation 814, the method 800 can continue to operation 816.

In operation 816, a build engine can build an annotation shared library 816 from the extracted routine file and the symbol table. The processes in Operation 816 can correspond with the components in the description of system 500 in FIG. 5. After the annotation shared library 816 is built, the method 800 can continue to operation 818.

In operation 818, the annotations in the simulator can be validated to ensure the correct annotation shared library corresponds to the correct application object file address. The validation can occur by computing a cryptographic hash, according to various embodiments. By computing a cryptographic hash, the build engine 120 can ensure that the application object file that generates the annotation shared library is matched to a specific version of the annotation shared library to ensure compatibility between different versions of the application object file. For example, if a first annotation shared library is indexed based on a symbol table of a first application object file, and the first application object file changes to a second application object file, e.g., from an added line, then the simulator can have an incorrect address for the reference to an annotation shared library. However, a cryptographic hash can be computed from the application object file which can associate a version of the application object file with the correct annotation shared library. For example the annotation shared library can be named based on the cryptographic hash of the associated application object file. Operation 818 can be described further herein. In various embodiments, the validation can be optional. After the validation of the annotations, then the method 800 can continue to operation 820.

In operation 820, the simulator can perform a simulation of the routines that are referenced by the instruction addresses in the application object file. Aspects of operation 820 can be further described in the system 700 in FIG. 7.

Figure 9:
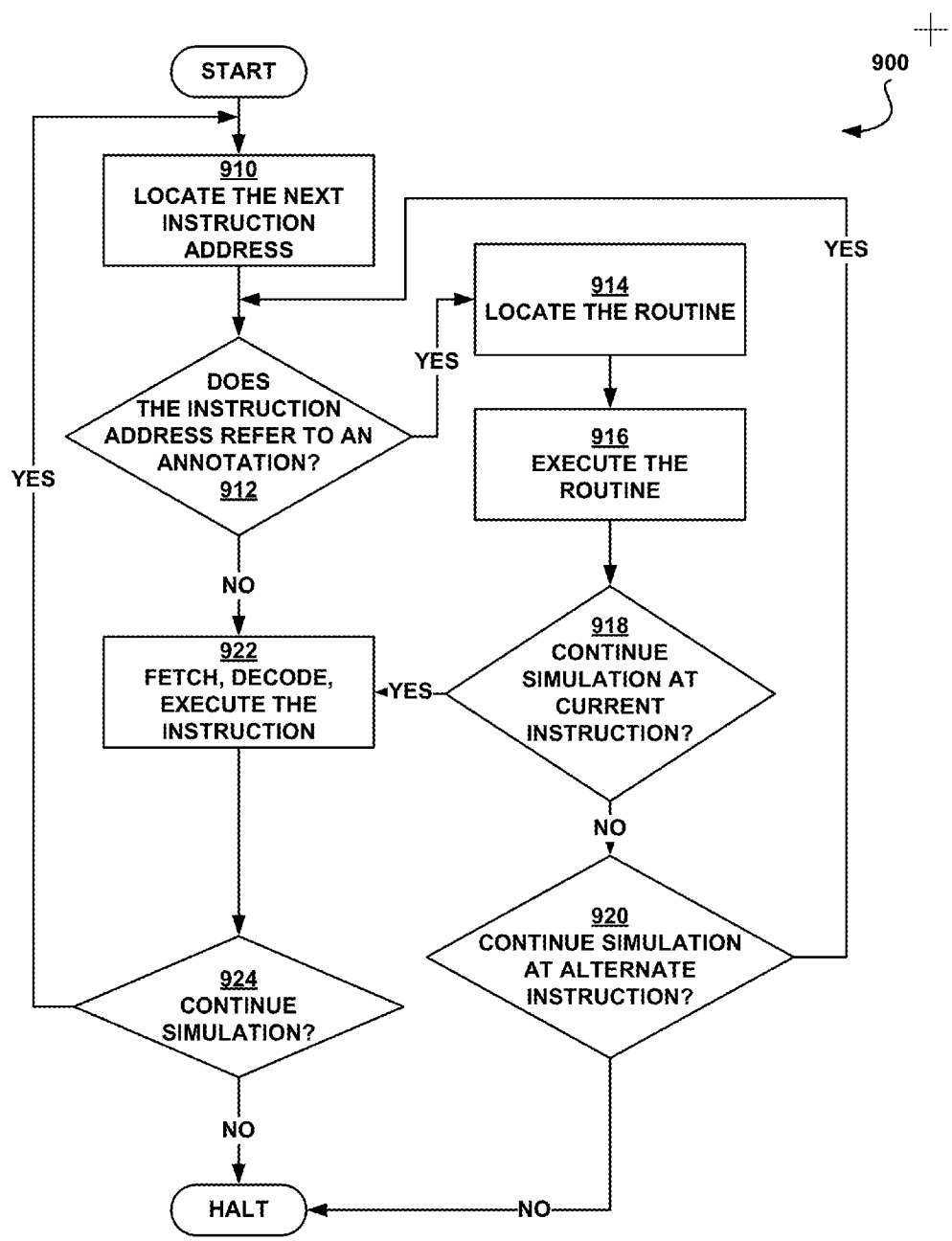
FIG. 9 illustrates a method of simulating the routine written in a high-level language, according to various embodiments.

FIG. 9 illustrates a method 900 of simulating the routine written in a high-level language, according to various embodiments. Aspects of method 900 can be described by the system 700 in FIG. 7. The simulator can read the application object file for instructions at particular addresses. The reading can occur sequentially and in the order of the addresses. The simulator can also refer to an instruction set simulator. The method 900 can begin in operation 910.

In operation 910, the simulator can examine the next instruction address. The next instruction address can be the address for the next instruction that the simulator will access. Once the next instruction address is located, then the method 900 can continue to operation 912.

In operation 912, the annotation manager in the simulator can determine whether the instruction address refers to an annotation. In various embodiments, the simulator can access an annotation table similar to annotation table 716 in FIG. 7. The annotation manager can compare the instruction address with the addresses in the annotation table. If there is a match, then the method 900 can continue to operation 914. If there is not a match, then the method 900 can continue to operation 922.

In operation 914, the annotation manager can locate the routine. The routine can be written in a high-level language. The annotation table can specify the language and arrange the proper interpreter for the routine. The annotation table can reference a particular file and an index in the file. The annotation manager can use the annotation to find the file and use the index to locate the corresponding routine.

The annotation table can specify whether the routine is executed before or after the instruction for the address. The simulator can set a default configuration that prefers to execute the routine before the instruction, but other configurations are contemplated. Assuming that the routine is to be executed before the instruction, then the method 900 can continue to operation 916.

In operation 916, the simulator can execute the routine. After the routine is executed, then the method 900 can continue to operation 918. In operation 918, the simulator can determine whether to continue the simulation at a current instruction. This may occur when the routine is executed at the end of a simulation and there are no more instructions to read in the application object file. If the simulator does not continue the simulation at the current instruction, then the method 900 can continue to operation 920. If the simulator continues the simulation, then the method 900 can continue to operation 922.

In operation 920, the simulator can determine whether the simulation continues at an alternate instruction. For example, a routine can force execution in another part of the application object file or call up an alternate instruction in addition to the current instruction. If the simulator continues the simulation at an alternate instruction, then the method 900 can continue to that particular instruction and undergo the analysis in operation 912. If the simulator does not continue the simulation at an alternate instruction, then the simulation halts.

In operation 922, the simulator can execute the instruction at the next instruction address. For example, the simulator can execute the next instruction once the instruction at the existing instruction address is executed. The address can contain both an instruction and a reference to a routine. If there are no more routines to run, then the simulator can continue executing instructions in a sequential manner. In various embodiments, the simulator can fetch the instruction at a particular address, and decode the instruction prior to executing the instruction.

After the next instruction is executed, then the method 900 can continue to operation 924 where the simulator can determine whether to process additional instructions. A parameter in the simulator can automatically stop the simulation. For example, the simulator can stop the simulation if a routine determines that the chip being simulated is failing after 5 instructions. The method 900 can continue to operation 910 if the simulation continues or can halt.

Figure 10:
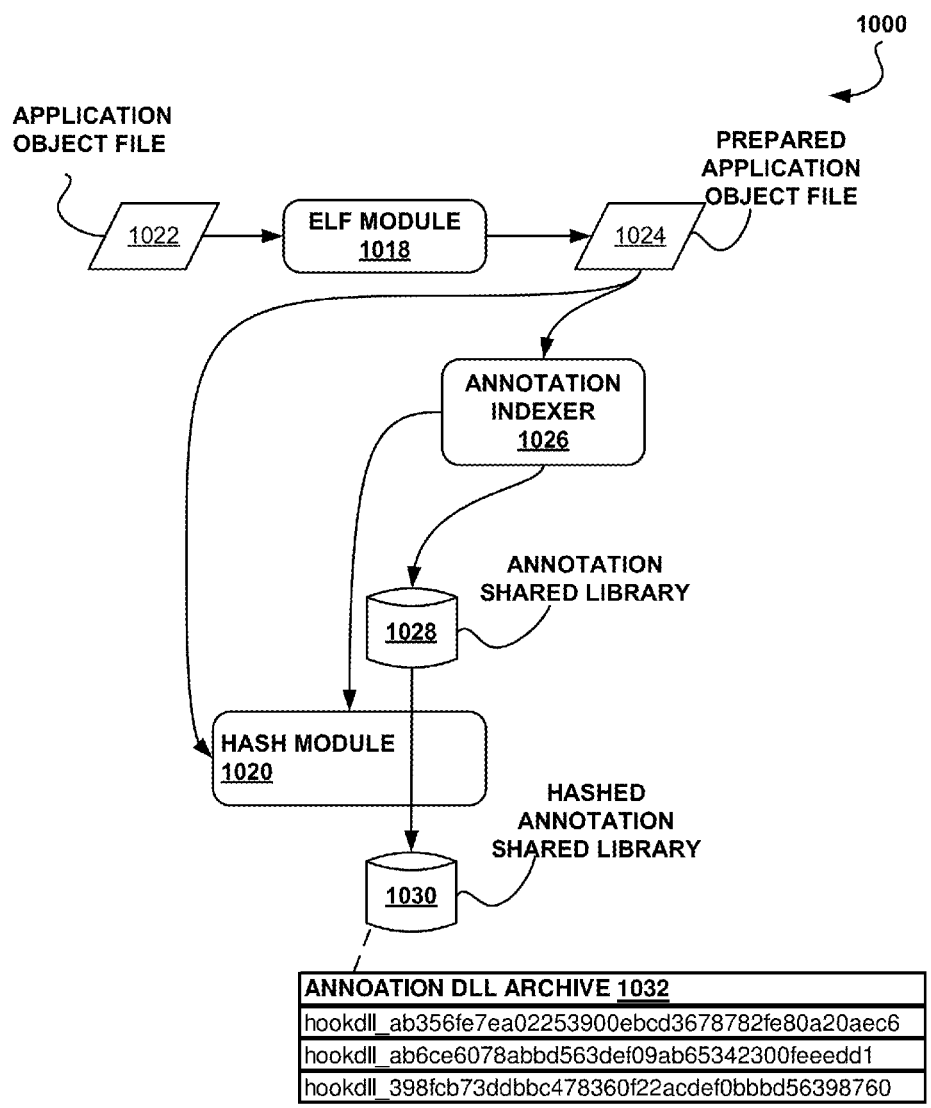
FIG. 10 illustrates a system that adds validation to an annotation shared library for a specific application object file, according to various embodiments.

FIG. 10 illustrates a system 1000 that adds validation to an annotation shared library for a specific application object file, according to various embodiments. Validation can ensure that the correct annotation shared library is loaded when the application object file is loaded into the full-system simulator. In various embodiments, the simulator can implement a 'chain of custody' that binds the annotation shared library and the application object file throughout the development process. For example, the simulator can require that the annotation shared library and the application object file reside together in the same directory with conventional names.

According to various embodiments, a Unix™-based, Executable and Linkable Format (ELF) module 1018 can add a special section to the application object file 1022 that includes the date, time, host name and process ID of the process implementing the validation protocol. The introduction of the special section in the hash module 1020 can produce a prepared application object file 1024. The addition of the special section can disambiguate versions of the application object file 1022 intended to be run against different annotation environments. The special section can be added as metadata that does not affect the final application binary in the prepared application object file 1024.

According to various embodiments, a system 1000 can also increase the uniqueness of the annotation shared library 1028 with a hash module 1020. The hash module 1020 can further make the annotation shared library 1028 more unique by utilizing a cryptographic hash.

In various embodiments, a hash of the application object file can be used, e.g., a cryptographic hash function such as secure hash algorithm (SHA)-1. With an SHA-1 hash function, the probability that two different application object files produce the same SHA-1 signature is astronomically small, i.e., on the order of 1 in 1 quintillion. In order to implement the SHA-1 hash function, the annotation indexer 1026 can be modified from the annotation indexer 526 illustrated in FIG. 10 to compute a cryptographic hash of the prepared application object file 1024 using the hash module 1020, and then name the affected library in the hashed annotation shared library 1030 with a name that includes a representation of the hash. For example, an SHA-1 hash value can be represented by a 40-character string. The simulation process, described in operation 818 and 820 can be modified so that whenever a prepared application object file 1024 is loaded, a hash module 1020, e.g., the simulator configuration script, can compute the hash of the prepared application object file 1024 and request that the hashed annotation shared library 1030 containing that name be loaded.

An example of a library in the hashed annotation shared library 1030 is shown in the table 1032. The table 1032 can be a special archive folder that includes Dynamic Link Libraries (DLLs) that are identified with a unique hash, according to various embodiments. The hash can be associated with the prepared application object file 1024. When the prepared application object file 1024 is loaded by the simulator, the simulator can compute the hash of the application object file through the hash module 1020 and load the corresponding DLL from the hook DLL archive directory.

Figure 11:
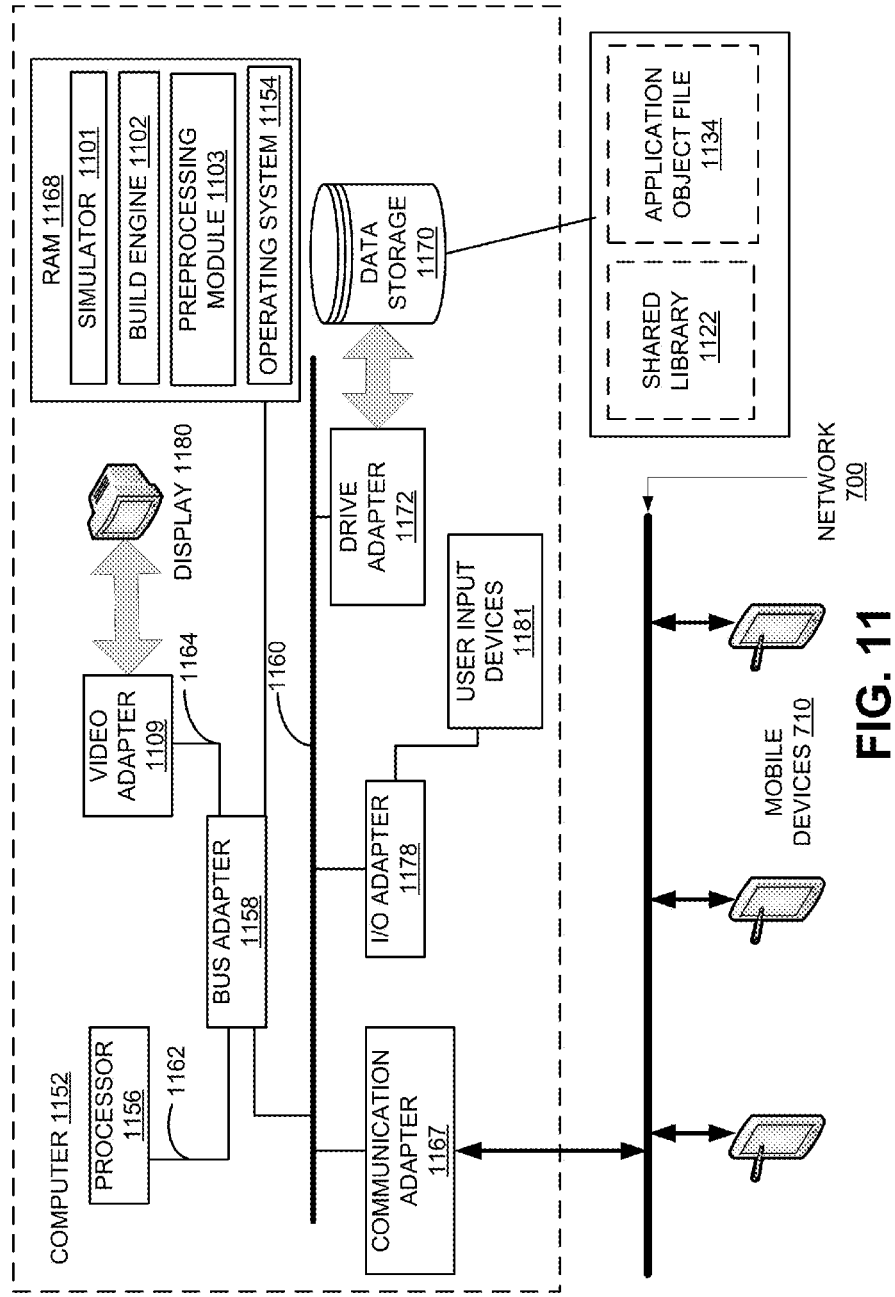
FIG. 11 depicts a block diagram of automated computing machinery, according to an embodiment.

FIG. 11 depicts a block diagram of automated computing machinery, according to an embodiment. The computing machinery can include example computer 1152 useful in performing aspects of the disclosure, according to various embodiments. The computer 1152 of FIG. 11 includes at least one computer processor 1156 or 'CPU' as well as random access memory 1168 ('RAM') which is connected through bus adapter 1158 to processor 1156 and to other components of the computer 1152.

The RAM 1168 can be configured to store a simulator 1101. The simulator 1101 can also include one or more associated components as separate programs within the simulator 1101. The RAM 1168 can include a build engine 1102, a module of computer program instructions designed for building an application object file and an annotation shared library, according to embodiments of the present invention. The RAM 1168 can also include a preprocessing module 1103 that can be computer instructions for separating the annotations from a primary file. Also stored in RAM 1168 is an operating system 1154. Operating systems useful for record filtering according to embodiments of the present invention include UNIX®, Linux®, Microsoft XP™ AIX®, IBM's i5/OS™, and others. The operating system 1154 and simulator 1101 are shown in RAM (1168), but many components of such software typically are stored in non-volatile memory also, such as, for example, on a disk drive 1170.

The computer 1152 can also include disk drive adapter 1172 coupled through expansion bus 1160 and bus adapter 1158 to processor 1156 and other components of the computer 1152. Disk drive adapter 1172 connects non-volatile data storage to the computer 1152 in the form of disk drive 1170. Disk drive adapters useful in computers include Integrated Drive Electronics ('IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on.

The disk drive 1170 can be a RAID-configured storage device that includes one or more disk drives. The disk drive 1170 can store the shared library 1122 and the application object file 1134 used by the simulator.

The example computer 1152 includes one or more input/output ('I/O') adapters 1178. I/O adapters implement user-oriented input/output through, for example, software drivers and computer hardware for controlling output to display devices such as computer display screens, as well as user input from user input devices 1181 such as keyboards and mice. The example computer 1152 includes a video adapter 1109, which is an example of an I/O adapter specially designed for graphic output to a display device 1180 such as a display screen or computer monitor. Video adapter 1109 is connected to processor 1156 through a high speed video bus 1164, bus adapter 1158, and the front side bus 1162, which is also a high speed bus.

The example computer 1152 includes a communications adapter 1167 for data communications with other computers 1110, e.g., mobile devices, and for data communications with a data communications network 1100. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications network communications, and IEEE 802.11 adapters for wireless data communications network communications.

A mobile device 1110 can have local programs that are separate from the simulator 1101. The local programs can work in conjunction with the simulator 1101.

Embodiments of the disclosure can take the form of an entirely hardware embodiment, an entirely software embodiment, or an embodiment containing both hardware and software elements. In one embodiment, the disclosure is implemented in software, which includes but is not limited to firmware, resident software, microcode, etc.

Furthermore, embodiments of the disclosure can take the form of a computer program product accessible from a computer-usable or computer-readable storage medium providing program code for use by or in connection with a computer or any instruction execution system. For the purposes of this description, a computer usable or computer readable storage medium can be any apparatus that can store the program for use by or in connection with the instruction execution system, apparatus, or device.

The computer-useable or computer-readable storage medium can be an electronic, magnetic, optical, electromagnetic, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/Write (CD-R/W), Blu-Ray Disc™, and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which may provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the disclosure have been described and illustrated, the disclosure is not to be limited to the specific forms or arrangements of parts so described and illustrated. The scope of the disclosure is to be defined by the claims appended hereto and their equivalents.

What is claimed is:

1. A method for simulation using multiple programming languages, comprising:
   receiving, at a module that is communicative coupled to a processor and a memory, an annotated source having a first plurality of programming instructions written in a first programming language and an annotation having a second plurality of programming instructions written in a second programming language and associated with an annotated programming instruction from the first plurality of programming instructions, wherein the first programming language is an assembly programming language and the second programming language is a high-level programming language;
   extracting the second plurality of programming instructions to create a routine from the annotation;
   building a shared library that contains the routine;
   building an application object file by assigning an address to each annotated programming instruction of the first plurality of programming instructions, wherein the application object file is formatted into machine readable code;
   creating an annotation table that associates the address for the annotated programming instruction with the routine; and
   validating compatibility between the application object file and the shared library by:
      loading the application object file,
      computing a hash for the application object file,
      associating the shared library with a representation of the hash,
      loading the associated shared library, and
      storing the hash in the application object file.

2. The method of claim 1, wherein the annotated source includes a plurality of files.

3. The method of claim 1, wherein extracting the second plurality of programming instructions includes:
   creating the routine from the second plurality of programming instructions; and
   extracting the routine into an extracted routine file.

4. The method of claim 3, wherein creating the routine includes:
   adding extra code to the second plurality of programming instructions that allows the routine to be parsed by a compiler.

5. The method of claim 1, wherein building the shared library includes:
   creating an annotation index source using a label that point to routines in the extracted routine file and a label address; and
   compiling the annotation index source and one or more extracted routine files into the shared library.

6. The method of claim 5, wherein creating the annotation index source includes:
   accessing an Executable and Linkable Format (ELF) symbol table from the application object file; and
   locating the label address with the ELF symbol table.

7. The method of claim 5, further comprising:
   adding the extracted routine file to the application object file.

8. The method of claim 7, wherein adding the extracted routine file includes:
   compiling the extracted routine file into object code;
   adding the compiled object code to the application object file as metadata.

9. The method of claim 1, wherein the annotation is identified as a comment within the first programming language.

10. A method of simulating an execution of an application object file having a high-level programming language element and an assembly programming language element, comprising:

loading the application object file and a shared library onto a simulated memory, the application object file contains a simulated memory address for a first program written in assembly programming language and the shared library contains a routine with a second program written in a high-level programming language;

extracting the routine containing the second program into an extracted routine file using an extraction script;

receiving, as part of executing the first program and at a simulator that is communicatively coupled to a processor and a memory, the simulated memory address associated with at least one first program, the simulated memory address indicates the first program on the object file;

accessing an annotation table that associates an annotation table address with the extracted routine file in the shared library;

comparing, by the simulator, the received simulated memory address to the annotation table address in the annotation table;

accessing, in response to the comparison, the routine; and executing the routine from the shared library.

11. The method of claim 10, wherein accessing the annotation table includes:

accessing an extracted routine file within the shared library referenced by the annotation table; and locating the routine within the extracted routine file.

12. The method of claim 10, wherein executing the routine comprises executing the routine before the first instructions on a same address.

13. The method of claim 10, wherein receiving, as part of executing the first program, the simulated memory address includes receiving a data address.

14. The method of claim 13, wherein executing the first program includes writing data at the data address.

15. The method of claim 13, wherein executing the first program includes reading data at the data address.

16. A system for managing a high-level programming language on a simulator comprising:

a pre-processor module configured to operate on one or more computer processors and to:

receive an annotated assembler source file that contains an address for a first programming instruction written in assembly programming language and a shared library that contains a routine that contains a second programming instruction written in a high-level programming language, and extract the routine containing the second programming instruction from the annotated assembler source file into an extracted routine file using an extraction script;

a build engine configured to operate on one or more computer processors and to:

create an application object file from the annotated assembler source file, and create an annotation shared library from the extracted routine file and from a symbol table of the application object file; and an annotation manager configured to operate on one or more computer processors and to:

load the annotation shared library and the application object file, receive the address that indicates the first programming instruction on the application object file, access an annotation table that associates an annotation table address with the extracted routine file in the annotation shared library, compare the programming instruction address with the annotation table address, access, in response to the comparison, a routine in the extracted routine file from the annotation shared library, and execute the routine from the annotation shared library.

17. The system of claim 16, wherein the annotation manager is further configured to execute the routine from the annotation shared library by:

executing the routine before the first programming instruction on a same address.

* * * * *